United States Patent [19]

Davis et al.

[11] Patent Number: 4,995,921

[45] Date of Patent: Feb. 26, 1991

[54] SOLDER PASTES USING ALCOHOL BLENDS AS RHEOLOGICAL AIDS

[75] Inventors: James L. Davis, Tamarac; Robert W. Pennisi, Boca Raton; Fadia Nounou, Plantation; Bobby D. Landreth, Davie, all of Fla.

[73] Assignee: Motorola, Inc., Schaumburg, Ill.

[21] Appl. No.: 521,871

[22] Filed: May 11, 1990

[51] Int. Cl.$^5$ .............................................. B23K 35/34
[52] U.S. Cl. ...................................... 148/22; 148/23; 148/25
[58] Field of Search ........................ 148/22, 23, 24, 25

[56] References Cited

U.S. PATENT DOCUMENTS

| | | | |
|---|---|---|---|
| 3,436,278 | 4/1969 | Poliak | 148/23 |
| 3,734,791 | 5/1973 | Poliak | 148/23 |
| 3,796,610 | 3/1974 | Sarnacki | 148/25 |
| 4,460,414 | 7/1984 | Hwang | 148/23 |

*Primary Examiner*—Peter D. Rosenberg
*Attorney, Agent, or Firm*—Daniel K. Nichols

[57] ABSTRACT

Solder paste vehicles using blends of monofunctional and polyfunctional alcohols are described. The blend may have a major portion of a low viscosity, monofunctional alcohol solvent and a minor portion of a high viscosity polyfunctional alcohol thickener. The monohydric solvent has a room temperature viscosity of at least 3 centipoise and from about 3 to 18 carbon atoms and may include such materials as 2-butanol, 1-hexanol, 1-heptanol, 1-octanol, 1-nonanol, 1-dodecanol, 2-ethoxyethanol, 2-(2-ethoxyethoxy)ethanol, 2-(2-butoxyethoxy)ethanol, n-hexadecanol, n-octadecanol, benzyl alcohol and mixtures thereof. The polyalcohol has a room temperature viscosity of between about 26 to about 1500 cp and includes compounds such as 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexane-diol; glycerol; 1,2,4-butanetriol; 2,2'-(ethylenedioxy)diethanol; 1,12-dodecane-diol; 1,16-hexanedecanediol and mixtures thereof. These blends give improved solubility of organic acid fluxing agents, provide relatively high viscosities of the solder paste and permit lower amounts of solvent to be used.

30 Claims, No Drawings

SOLDER PASTES USING ALCOHOL BLENDS AS RHEOLOGICAL AIDS

FIELD OF THE INVENTION

The invention relates to solder paste formulations, and in one aspect, more particularly relates to the vehicles and solvents used in solder paste formulations.

BACKGROUND OF THE INVENTION

Solder formulations known as solder creams or solder pastes are homo-geneous blends of a soft solder alloy typically in a powder form dispersed in a liquid medium conventionally containing a fluxing composition or flux, an organic solvent, and a thickening agent which will give the desired viscous or paste-like consistency to the solder formulation. Such solder formulations can be applied to the surfaces or locations requiring soldering in a number of various ways, such as by screen printing, or by means of a dispenser such as a syringe, or simply by dipping the site to be soldered into the solder paste formulation so that the viscous paste adheres to the site, which may be an electronic component lead.

Recently, solder paste formulations have been used increasingly by the electronics industry, particularly in the automated manufacture of printed circuits in which leadless miniature electronic components are surface mounted on a printed circuit board (PCB) to which a solder paste formulation has previously been applied, such as by screen printing. The PCB is then subjected to a sufficiently high temperature, for example by means of a heated conveyor belt, to cause the flux and solder alloy in the formulation to liquefy and contact the electronic component leads so that on subsequent cooling of the PCB, the components will remain soldered on the PCB.

The rheological properties of the solder paste dictate the screen print-ability of the material. Hence, in order to obtain good line definition on the PCB, the rheology of the paste must fall within a relatively narrow process window. Solder paste rheology is largely determined by those components of the solder paste which are collectively known as the vehicle. Generally, solder paste vehicles consist of solvents to dissolve the rosin fluxes or fluxing agents and the activators, and other additives to achieve the proper rheology. Currently, cyclohexanol (sorbitol) derivatives and various Cellosolve TM mono- and dialkyl ethers of ethylene glycol and derivatives thereof are used in commercial solder pastes. Problems encountered with conventional solvents include poor solubility of the organic acid fluxing agents in the solvents which is sometimes addressed by using more solvent than is considered desirable, and an inability to obtain high viscosities (poor rheological control). Many of these components do not volatilize under reflow conditions and therefore result in a residue which needs to be removed by chlorofluorocarbon (CFC), terpene, aqueous, exotic gas or other cleaning techniques. Some of these materials are hazardous or toxic and CFCs have been linked to the undesirable degradation of atmospheric ozone. Thus, it would be an improvement in the art to eliminate residues and the materials used to remove them.

For some uses in the electronics industry, it is desirable to use as the flux composition of the solder formulation a material which is non-corrosive and which will leave, after the heating and cooling steps, flux residues which are themselves non-corrosive and non-conducting. For this reason, rosin-based flux compositions are widely used in the commercially available solder paste formulations specifically made for use in the manufacture of surface mounted electronic components.

Alternatively, more reactive fluxing compositions may be used, which leave residues which are corrosive and/or conductive. Often a somewhat corrosive fluxing composition is desired so that the oxides which form on the metal surfaces may be removed to permit the subsequently formed solder bond to be stronger both physically and electrically. However, it is necessary to remove the residues formed by means of either aqueous or organic solvent systems to ensure that the resulting soldered circuit is non-corrosive.

The use of solder paste formulations containing such rosin-based or more reactive fluxes produces a number of disadvantages. First, because non-corrosive residues tend to be sticky, they prevent repetitive automatic testing of the circuit. Additionally, such residues are unsightly and therefor, as with the corrosive flux residues which are also unattractive, will need to be removed. The removal step involves extra production equipment, time and material.

Secondly, flux residues tend to be hygroscopic and may thereby cause spattering. Thirdly, some fluxes permit solder particles in the paste to move away from the solder site and give rise to the formation of numbers of discrete small balls of soft solder around the soldered joints, which can create electrical short circuits.

Because of these and other disadvantages, it is desirable and often essential to meet specifications, to remove the flux residues and any solder balls as much as possible. Often, however, their removal is difficult or impossible, particularly from areas of the PCB underneath the electronic components. As noted, a common procedure is to use an aqueous or organic solvent in the removal of flux residues. Aqueous washes are preferred because the disposal of the waste products is easier than for organic solvents.

Though the solvents of the vehicles are usually readily removable by water or mild solvents, any new system should require no cleaning at all. It would therefore be advantageous to discover a new flux vehicle that would avoid one or more of the disadvantages of the prior solder flux vehicles.

SUMMARY OF THE INVENTION

Accordingly, it is an object of the present invention to provide a solder formulation vehicle that would not only serve as a solvent but also provide the necessary rheological properties of the vehicle and result in little to no residue formation after reflow.

It is another object of the present invention to provide a novel flux vehicle with improved solubility for organic acid fluxing agents.

It is yet another object of the invention to provide a solder powder vehicle that would perform well in relatively small amounts and thereby not require an undesirably excess amount of solvent.

In carrying out these and other objects of the invention, there is provided, in one form, a vehicle for powdered solder having a low viscosity, monofunctional alcohol solvent and a relatively high viscosity polyfunctional alcohol thickener having at least two hydroxyl groups. These alcohols all volatilize at or near solder reflow conditions resulting in little to no residue.

DETAILED DESCRIPTION OF THE INVENTION

It has been discovered that a blend of monoalcohols and polyalcohols are especially useful in solder paste vehicles. Through the judicious use of these alcohols, the rheological properties of the solder paste can be tailored to meet exacting requirements. Surprisingly, this mixture of alcohols has been found to serve as both a solvent for the organic acids used as fluxing agents and activators, and as thickening agents to achieve proper rheology. In fact, no other thickening agent need be employed. The use of alcohol mixtures to simultaneously meet rheology and solvent requirements is expected to lower the number of processing steps required in solder paste formulations. In addition, by reducing the amount of additives, such as thickeners, required for acceptable screen printing, the residues remaining from the solder paste following solder reflow will be significantly lowered or eliminated.

For optimum performance of the solder paste, all alcohols in the vehicle should exhibit a boiling point between about 150° C. and about 350° C., in one aspect from between about 175° C. and about 270° C. Lower boiling alcohols will evaporate prior to reflow causing the paste to dry out too readily. In contrast, higher boiling point alcohol solvents are not evaporated as solvents and remain behind as residues. Alcohols with boiling points between 150° C. and 350° C. usually exhibit very low vapor pressures at room temperature, resulting in little or no solvent evaporation in ambient environments.

The choice of alcohols will be determined in part by the type of solder they are to be used with. For example, high temperature solders, such as high silver content solders, require alcohols with boiling points around 350° C. Higher boiling point alcohols with greater functionality and higher carbon content could be used. The more common low temperature solders, such as the ones described in more detail here, would need alcohols boiling lower, in the range of about 175° to about 270° C.

It has been found that best results are achieved when lower viscosity primary monoalcohols and substituted alcohols are blended with polyfunctional alcohols such as di-alcohols and tri-alcohols. In one aspect, the viscosity of the monoalcohols used in the vehicle blend should be at least 3 centipoise at room temperature, and in a more preferred aspect from about 3 to about 20 cps. The viscosity of the high viscosity polyfunctional alcohol thickeners in one aspect ranges from about 20 to about 1500 cps at room temperature, and more preferably ranges from about 26 to about 1000 cps.

More specifically, the low viscosity, monofunctional alcohol solvents have one hydroxyl group and from about 3 to about 18 carbon atoms, and are within the viscosity ranges noted above. Examples of such monoalcohols include, but are not limited to, 2-butanol, 1-hexanol, 1-heptanol, 1-octanol, 1-nonanol, 1-dodecanol, 2-ethoxyethanol, 2-(2-ethoxyethoxy)ethanol, 2(2-butoxyethoxy)ethanol n-hexadecanol, n-octadecanol, benzyl alcohol and mixtures thereof.

The high viscosity polyfunctional alcohol thickeners have at least two hydroxyl groups and may have from about 2 to about 16 carbon atoms. Suitable polyalcohols include, but are not limited to, 1,2-ethanediol (also known as ethylene glycol); 1,2-propanediol (propylene glycol); 1,3-propanediol; 1,2-butanediol; 1,3-butanediol; 1,4-butanediol; 1,2-pentanediol; 1,5-pentanediol; 2,4-pentanediol; 2,5-hexanediol; glycerol (also known as glycerin or 1,2,3-propanetriol); 1,2,4-butanetriol; 2,2'-(ethylenedioxy)diethanol; 1,12-dodecanediol; 1,16-hexanedecanediol and mixtures thereof.

In one aspect, the low viscosity, monofunctional alcohol solvent forms the major portion or greater than 50 wt. % of the alcohol blend, and the high viscosity polyfunctional alcohol thickener comprises a minor portion or less than 50 wt % of the alcohol blend. In a preferred embodiment, the monoalcohol component ranges from about 75 to about 90 wt. % and the polyalcohol ranges from about 10 to about 25 wt. %. While it is permitted to add additional thickeners to the system of this invention, and perhaps preferred in some situations, in most cases it is anticipated that no additional thickener need be used beyond the high viscosity polyfunctional alcohol thickeners. It is bvlieved that the proportions of the two alcohols can be adjusted to give the desired rheological properties in the majority of applications.

It is also anticipated that conventional solvent powders containing various combinations and proportions of the commonly used materials lead, tin, antimony, silver, etc. may be used readily in conjunction with the vehicles of the present invention. Other vehicle additives, such as surfactants, odorants, bactericides, fungicides, antifoam agents, etc. may be added as desired with no deleterious effects. Conventional and new organic acid fluxing agents may also be used in conjunction with the solvent blends of the present invention. Of course, one skilled in the art would study the solubilities of such agents in the particular blend as a routine procedure in making any new solder powder formulation.

The present invention will be further illustrated with respect to the following detailed, non-limiting examples. Solder pastes were formulated using the solvents described above. These pastes exhibited acceptable rheological properties, resulting in good screen print definition. The composition of the paste varied from 88-92 wt. % solder powder and 5-12 wt. % alcohol blends. The remainder was organic acids added as fluxes and activators.

EXAMPLE 1

A solder paste vehicle was formulated with the following composition:

| | |
|---|---|
| 2,5-Hexanediol | 24 wt. % |
| 1-Dodecanol | 76 wt. % |

EXAMPLE 2

A solder paste vehicle was formulated with the following composition:

| | |
|---|---|
| Benzyl alcohol | 88 wt. % |
| 2,5-Hexanediol | 12 wt. % |

EXAMPLE 3

A variety of solder powders were formulated within the following compositional ranges:

|  | Wt. % |
| --- | --- |
| Sn/Pb/Ag solder powder (−300/200 mesh) | 88.0–92.0 |
| Organic acid flux | 0.2–3.0 |
| Alcohol mixture (from Examples 1 or 2) | 5.0–11.8 |

The screen printability of the paste was excellent. The screen printing was performed both by hand and using the automatic screen printer. Reflow characteristics were excellent. A small amount of white-to-clear residue remained after reflow, which was readily removed by water rinses.

Thus, alcohol blends have been advantageously added to solder paste vehicles to replace the nonvolatile resinous and cyclohexanol derivatives and the volatile Cellosolve ™ solvents commonly used in commercial solvent pastes. The benefits of the alcohol blends described include (1) improvement in the solubility of the organic acid fluxing agents, (2) achievement of high viscosities, (3) reduced amounts of solvents and (4) elimination of residue forming compounds.

It will be appreciated that modifications may be made in the exact implementation of the invention illustrated in the above examples which would still fall within the spirit and scope of the invention as claimed herein. For example, it is anticipated that the processing conditions, modes or sequences of addition of the alcohols, and exact combinations of low viscosity, monofunctional alcohol solvents and high viscosity polyfunctional alcohol thickeners may be altered to optimize the invention by one skilled in the art. One skilled in the art may find that a particular blend of certain alcohols not explicitly set out herein is advantageous.

We claim:

1. A vehicle for powdered solder for solder pastes comprising:
   a low viscosity, monofunctional alcohol solvent, having a room temperature
   viscosity of between about 3 and about 20 centipoise; and
   a relatively high viscosity polyfunctional alcohol thickener having at least two hydroxyl groups, and having a room temperature viscosity of between about 20 to about 1500 centipoise.

2. The vehicle of claim 1 where the boiling points of both the low viscosity, monofunctional alcohol solvent and the high viscosity polyfunctional alcohol thickener is between about 175 and about 270° C., inclusive.

3. The vehicle of claim 1 where the low viscosity, monofunctional alcohol solvent is a compound having one hydroxyl group and from about 3 to about 12 carbon atoms.

4. The vehicle of claim 1 where the low viscosity, monofunctional alcohol solvent is selected from the group consisting of 2-butanol, 1-hexanol, 1-heptanol, 1-octanol, 1-nonanol, 1-dodecanol, 2-ethoxyethanol, 2-(2-ethoxyethoxy)ethanol, 2-(2-butoxyethoxy)ethanol, n-hexadecanol, n-octadecanol, benzyl alcohol and mixtures thereof.

5. The vehicle of claim 1 where the relatively high viscosity polyfunctional alcohol thickener is a compound having from about 2 to about 16 carbon atoms.

6. The vehicle of claim 1 where the relatively high viscosity polyfunctional alcohol thickener is selected from the group consisting of 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexanediol; glycerol; 1,2,4-butanetriol; 2,2'-(ethylenedioxy)diethanol; 1,12-dodecanediol; 1,16-hexanedec-anediol and mixtures thereof.

7. The vehicle of claim 1 where the proportion of low viscosity, monofunctional alcohol solvent ranges from about 75 to about 90% of the vehicle, and where the proportion of high viscosity polyfunctional alcohol thickener ranges from about 10 to about 25% of the vehicle.

8. The vehicle of claim 1 where the high viscosity polyfunctional alcohol thickener is the only thickener used in the vehicle.

9. A vehicle for powdered solder for solder pastes comprising:
   a low viscosity, monofunctional alcohol solvent having from about 3 to about 18 carbon atoms and a room temperature viscosity in the range of about 3 to about 20 centipoise; and
   a relatively high viscosity polyfunctional alcohol thickener having at least two hydroxyl groups and from about 2 to about 16 carbon atoms, and having a room temperature viscosity in the range of about 20 to about 1500 centipoise;
   where the boiling points of both the low viscosity, monofunctional alcohol solvent and the high viscosity polyfunctional alcohol thickener is between about 175 and about 270° C., inclusive.

10. The vehicle of claim 9 where the low viscosity, monofunctional alcohol solvent is selected from the group consisting of 2-butanol, 1-hexanol, 1-hep-tanol, 1-octanol, 1-nonanol, 1-dodecanol, 2-ethoxyethanol, 2(2-ethoxyethoxy)ethanol, 2(2-butoxyethoxy)ethanol, n-hexadecanol, n-octadecanol, benzyl alcohol and mixtures thereof.

11. The vehicle of claim 9 where the relatively high viscosity polyfunctional alcohol thickener is selected from the group consisting of 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexanediol; glycerol; 1,2,4-butanetriol; 2,2'-(ethylenedioxy)diethanol; 1,12-dodecanediol; 1,16-hexanedec-anediol and mixtures thereof.

12. The vehicle of claim 9 where the proportion of low viscosity, mono-functional alcohol solvent ranges from about 75 to about 90% of the vehicle, and where the proportion of high viscosity polyfunctional alcohol thickener ranges from about 10 to about 25% of the vehicle.

13. The vehicle of claim 1 where the high viscosity polyfunctional alcohol thickener is the only thickener used in the vehicle.

14. A vehicle for powdered solder for solder pastes comprising:
   a low viscosity, monofunctional alcohol solvent having from about 3 to about 18 carbon atoms and a room temperature viscosity in the range of about 3 to about 20 centipoise; and
   a relatively high viscosity polyfunctional alcohol thickener having at least two hydroxyl groups and from about 2 to about 16 carbon atoms, and having a room temperature viscosity in the range of about 20 to about 1500 centipoise, and where the high viscosity polyfunctional alcohol thickener is the only thickener in the vehicle;
   where the boiling points of both the low viscosity, monofunctional alcohol solvent and the high viscosity polyfunctional alcohol thickener is between about 175 and about 270° C., inclusive, and where the proportion of low viscosity, monofunctional alcohol solvent ranges from about 75 to about 90% of the vehicle, and where the proportion of high viscosity polyfunctional alcohol thickener ranges from about 10 to about 25% of the vehicle.

15. The vehicle of claim 14 where the low viscosity, monofunctional alcohol solvent is selected from the group consisting of 2-butanol, 1-hexanol, 1-heptan-ol, 1-octanol, 1-nonanol, 1-dodecanol, 2-ethoxyethanol, 2-(2-ethoxyethoxy)ethanol, 2-(2-butoxyethoxy)ethanol, n-hexadecanol, n-octadecanol, benzyl alcohol and mixtures thereof.

16. The vehicle of claim 14 where the relatively high viscosity polyfunc-tional alcohol thickener is selected from the group consisting of 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexanediol; glycerol; 1,2,4-butanetriol; 2,2'-(ethylenedioxy)diethanol; 1,12-dodecanediol; 1,16-hexanedec-anediol and mixtures thereof.

17. A solder paste formulation comprising:
   a vehicle comprising:
      a low viscosity, monofunctional alcohol solvent, having a room temperature viscosity of between about 3 and about 20 centipoise; and
      a relatively high viscosity polyfunctional alcohol thickener having at least two hydroxyl groups, and having a room temperature viscosity of between about 20 to about 1500 centipoise;
   a solder powder; and
   a fluxing agent.

18. The solder paste formulation of claim 17 where in the vehicle the boiling points of both the low viscosity, monofunctional alcohol solvent and the high viscosity polyfunctional alcohol thickener is between about 175 and about 270° C., inclusive.

19. The solder paste formulation of claim 17 where in the vehicle the low viscosity, monofunctional alcohol solvent is a compound having one hydroxyl group and from about 3 to about 18 carbon atoms.

20. The solder paste formulation of claim 17 where in the vehicle the low viscosity, monofunctional alcohol solvent is selected from the group consisting of 2-butanol, 1-hexanol, 1-heptanol, 1-octanol, 1-nonanol, 1-dodecanol, 2-ethoxyethanol, 2-(2-ethoxyethoxy)ethanol, 2-(2-butoxyethoxy)ethanol, n-hexadecanol, n-octadecanol, benzyl alcohol and mixtures thereof.

21. The solder paste formulation of claim 17 where in the vehicle the relatively high viscosity polyfunctional alcohol thickener is a compound having from about 2 to about 16 carbon atoms.

22. The solder paste formulation of claim 17 where in the vehicle the relatively high viscosity polyfunctional alcohol thickener is selected from the group consisting of 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexanediol; glycerol; 1,2,4-butanetriol; 2,2'-(ethylenedioxy)diethanol; 1,12-dodecanediol; 1,16-hexanedecanediol and mixtures thereof.

23. The solder paste formulation of claim 17 where in the vehicle the proportion of low viscosity, monofunctional alcohol solvent ranges from about 75 to about 90% of the vehicle, and where the proportion of high viscosity polyfunctional alcohol thickener ranges from about 10 to about 25% of the vehicle.

24. The solder paste formulation of claim 17 where in the vehicle the high viscosity polyfunctional alcohol thickener is the only thickener used in the vehicle.

25. The solder paste formulation of claim 17 where the solder powder contains metals selected from the group consisting of tin, lead, antimony, silver and mixtures thereof.

26. A printed circuit board (PCB) bearing solder paste comprising:
   an insulative substrate;
   a plurality of conductive circuit traces on the insulative substrate;
   bonding areas on the insulative substrate, where the bonding areas are in electrical contact with the electrical traces; and
   a solder paste on at least one of the bonding areas, where the solder paste comprises:
      a vehicle comprising:
         a low viscosity, monofunctional alcohol solvent, having a room temperature viscosity of between about 3 and about 20 centipose; and
         a relatively high viscosity polyfunctional alcohol thickener having at least two hydroxyl groups, and having a room temperature viscosity of between about 20 to about 1500 centipoise;
      a solder powder; and
      a fluxing agent.

27. The PCB of claim 26 where in the solder paste, in the vehicle the boiling points of both the low viscosity, monofunctional alcohol solvent and the high viscosity polyfunctional alcohol thickener is between about 175° and about 270° C., inclusive.

28. The PCB of claim 26 where in the solder paste, in the vehicle the low viscosity, monofunctional alcohol solvent is a compound having one hydroxyl group and from about 3 to about 18 carbon atoms.

29. The PCB of claim 26 where in the solder paste, in the vehicle the relatively high viscosity polyfunctional alcohol thickener is a compound having from about 2 to about 16 carbon atoms.

30. The PCB of claim 26 where in the solder paste, in the vehicle the propor-tion of low viscosity, monofunctional alcohol solvent ranges from about 75 to about 90% of the vehicle, and where the proportion of high viscosity polyfunc-tional alcohol thickener ranges from about 10 to about 25% of the vehicle.

* * * * *